Jan. 24, 1967 C. M. PARSHALL ET AL Re. 26,147
MILL
Original Filed Sept. 24, 1952 2 Sheets-Sheet 1
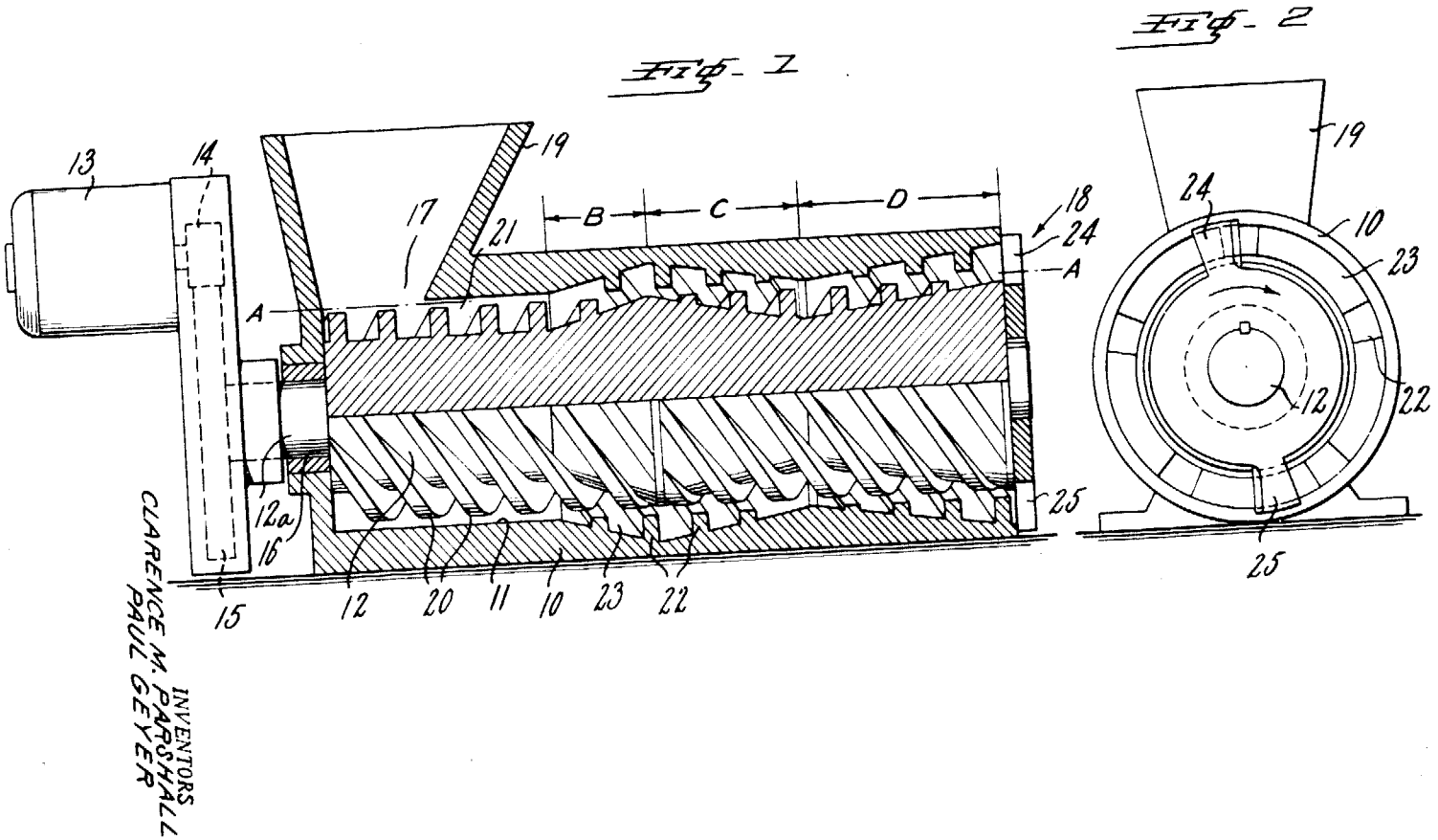

MILL
Original Filed Sept. 24, 1952 2 Sheets-Sheet 2
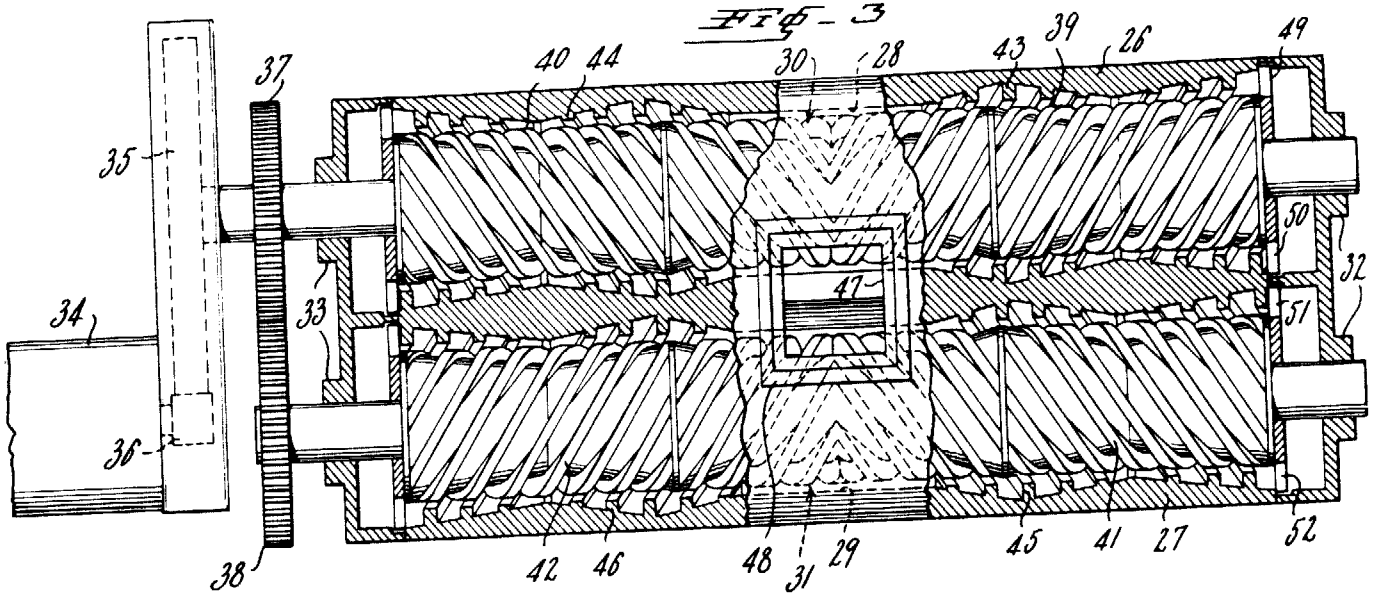
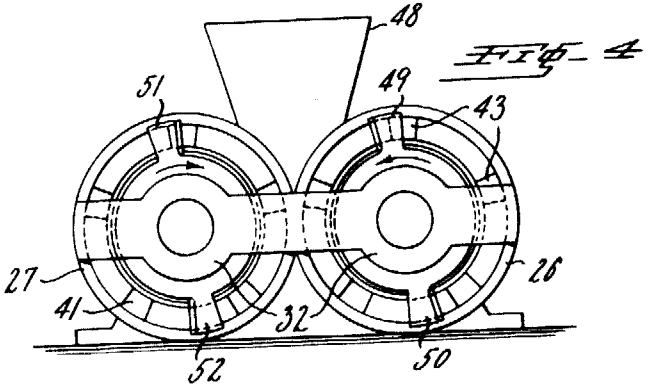
INVENTORS
CLARENCE M. PARSHALL
PAUL GEYER United States Patent Office Re. 26,147
Reissued Jan. 24, 1967

26,147
MILL

Clarence M. Parshall, Grosse Pointe Woods, and Paul Geyer, Detroit, Mich., assignors to United States Rubber Company, New York, N.Y., a corporation of New Jersey Original No. 2,744,287, dated May 8, 1956, Ser. No. 311,243, Sept. 24, 1952. Application for reissue Feb. 1, 1966, Ser. No. 537,583
16 Claims. (Cl. 18—12)

Matter enclosed in heavy brackets [ ] appears in the original patent but forms no part of this reissue specification; matter printed in italics indicates the additions made by reissue.

This invention relates to mills for mixing and working rubber-like compounds, and more particularly the invention relates to improvements in screw or worm type mills.

Conventional mills of this type heretofore used included a rotor and a tube or barrel in which the rotor was adapted to be rotated. The rotor was in the form of a continuous worm or screw which when rotated served to force the stock through the barrel. The stock was carried in the grooves formed between the threads of the screw or worm and the stock was mixed and worked by the intensive shearing action developed in the clearance between the barrel and the crest of the threads. A disadvantage of conventional mills of this type was that center portions of the stock carried in the grooves between the treads were often never subjected to the shearing action with the result that lumps of unmixed, unworked stock would work their way through the mill.

It is, therefore, an object of the present invention to provide a screw or worm type mill which will subject all the stock to the shearing action between the rotating rotor and the stationary barrel and thereby eliminate the possibility of unmixed, unworked lumps working their way through the mill.

Another object is to provide a mill which will mix and work all portions of the stock uniformly so that all portions of the stock will be mixed and worked substantially the same amount.

Another object of the invention is to provide a screw or worm type mill having grooves in the bore of the barrel through which the stock is discharged so that the stock may be cut into pellets as it is discharged through the grooves by rotating knives secured to the end of the rotor.

To accomplish the above objects, both the rotor and the barrel of the mill of the present invention are provided with grooves in which the stock may be carried. The grooves are so proportioned and related that all the stock in its passage through the mill must pass from the grooves in the rotor to the grooves in the barrel or vice versa. By this construction it is insured that all the stock will pass through the shear plane developed between the rotor and the barrel and be thoroughly mixed and worked thereby.

Other objects and advantages of the invention will become apparent from the following description when read in conjunction with the accompanying drawings, wherein:

FIGURE 1 is a sectional elevational view of a single ended, single barrel mill embodying the present invention;

FIG. 2 is an end view of the discharged end of the mill of FIG. 1;

FIG. 3 is a plan view with parts broken away to show interior details of a double ended, double barrel mill embodying the present invention; and FIG. 4 is an end view of the mill of FIG. 3.

Referring to the drawings and in particular to FIGS.

1 and 2 of the drawing, there is shown one embodiment of the invention. This embodiment includes a barrel 10 having a bore 11 extending therethrough. A rotor 12 is rotatably mounted in the bore 11. The rotor 12 is adapted to be rotated by means of a motor 13 which is coupled by means of reduction gears 14 and 15 to an extension 12a of the rotor 12 which extends through an opening 16 in the end of the barrel.

The barrel 10 is provided with an opening 17 in the top thereof remote from the discharge end 18 of the barrel 10 through which stock to be mixed may be introduced into the mill. A funnel shaped hopper 19 surrounds the opening 17 to facilitate introduction of the stock.

The rotor 12 is provided with helical threads 20. Stock introduced through the opening 17 occupies grooves 21 formed between the threads 20 and rotation of the rotor 12 in the direction of the arrow in FIG. 2 forces the stock towards the discharge end 18 of the barrel 10. Mixing and working of the rubber is accomplished by the intensive shearing action developed in the clearance between the crest of the threads 20 and the surface of the bore 11 as the stock is moved towards the discharge end 18 by rotation of the rotor 12. This area of shear may be defined as a cylindrical shear plane which contains the line A—A of FIG. 1. It can be seen that if the threads 20 are of constant depth throughout the length of the rotor 12 that only surface portions of the stock carried in the grooves 21 between the threads are subjected to the intensive shearing action with the result that center portions of the stock may work their way through the mill without being mixed or worked. This is eliminated in the present invention by decreasing the depth of the threads 20 to substantially zero depth at some point along the length of the rotor 12 and by providing helical threads 22 of increasing depth in the bore 11 along a co-extensive portion. By this construction, all the stock in passing through the mill is transferred from the grooves 21 between the threads 20 in the rotor 12 to grooves 23 formed between the threads 22 in the bore 11 so that all the stock must pass through the shear plane and be thoroughly mixed and worked thereby.

In FIG. 1, the threads 20 are gradually decreased in depth to substantially zero depth through the distance B. Corresponding helical threads 22 in the bore 11 gradually increase in depth from a zero depth over the same distance B. It can be seen, therefore, that all the stock in its passage through the distance B must pass from the grooves 21 between the threads 20 to the grooves 23 formed between the threads 22 in the wall of the bore 11 and in so doing must pass through the shear plane identified by the line A—A.

In the apparatus of FIG. 1, the stock is passed through the shear plane three times before it is discharged, once through distance B as above described; once through distance C in which the threads 22 of the bore 11 gradually decrease to zero depth and the threads 20 of the rotor 11 increase in depth and once through the distance D in which the threads 20 gradually decrease to zero depth and threads 22 gradually increase in depth. It can be seen, therefore, that though neither grooves 21 nor 23 alone form a continuous passage through the mill that together they do form a continuous passage which intersects the shear plane A—A so that all the stock must pass through the shear plane.

It is to be understood that variations can be made in this arrangement. For example, the threads 20 of the rotor 12 could be continued full depth through distances B and C and the threads 22 in this distance eliminated with the result that the stock will pass through the shear plane only once in the distance D and be extruded through the ends of the grooves 21 which are open at the discharge end of the barrel as shown in FIG. 2. On the other hand, the threads 20 of the rotor 12 could be continued full depth through the distance D and the threads 22 in this distance eliminated in which case the stock would pass through the shear plane twice, once in the distance B and once in the distance C and then be extruded out the end of the rotor.

The provision of the decrease in depth of the threads 20 of the rotor and the provision of threads 22 of gradually increasing depth in the bore 11 at the discharge end of the mill as in the distance D of FIG. 1 provides an additional advantage. The open ends of the grooves 23 between the threads 22 in the bore 11 provide stationary orifices at the discharge end of the mill, as best shown in FIG. 2, through which the stock is extruded. By securing knives such as shown at 24 and 25 to the end of the rotor 12, the stock extruded from the open ends of the grooves 23 may be cut into pellets as the rotor 12 is rotated. Cutting the stock into small pellets facilitates handling of the mixed stock.

While the invention has been above described as incorporated in a single barrel, single ended mill, it is to be understood that the invention can be incorporated in double ended, single barrel mills; single ended, double barrel mills; or double ended, double barrel mills.

FIGS. 3 and 4 show the invention incorporated in a double ended, double barrel mill. As the name implies this mill has two barrels 26 and 27, providing two parallel bores 28 and 29. Two helically threaded rotors 30 and 31 are mounted for rotation in bores 28 and 29, respectively, and are supported for rotation in bearings 32 and 33 secured to but spaced from the ends of the barrels. Spacing of the bearings 32 and 33 from the ends of the barrels 26 and 27 allows stock to be discharged from both ends of each barrel. The rotors 30 and 31 are adapted to be rotated in opposite directions as indicated by the arrows in FIG. 4 by a motor 34 which is coupled to one end of rotor 30 through reduction gears 35 and 36. Rotor 31 is driven in the opposite direction from rotor 30 by means of meshing gears 37 and 38 secured to rotors 30 and 31 respectively.

Rotor 30 is provided with two sets of helical threads 39 and 40 which initiate at the mid-point of the rotor and wind in opposite directions toward each end of the rotor 30. Each set of these helical threads function in the same manner and are of the same form as threads 20 of the mill of FIG. 1. Rotor 31 is provided with similar helical threads 41 and 42 of opposite hands. Threads 39, 40, 41 and 42 serve, when the rotors 30 and 31 are rotated in the direction of the arrows of FIG. 4, to force stock introduced at the mid-point of the rotors toward each end of each of the barrels 26 and 27.

The bore 28 of barrel 26 is provided with two sets of helical threads 43 and 44, each set of which function in the same manner and are of the same form as the threads 22 of the mill of FIG. 1. The bore 29 of the barrel 27 is provided with similar sets of helical threads 45 and 46 of opposite hand from the threads 43 and 44.

The barrels 26 and 27 are provided with a common opening 47 midway between the ends thereof through which stock may be introduced into the mill. A funnel shaped hopper 48 surrounds the opening 47 to facilitate the introduction of the stock. Knives 49, 50, 51 and 52, similar to the knives 24 and 25 of the single end mill of FIG. 1, may be secured to each end of the rotors 30 and 31 as shown in FIG. 4 to cut the discharged stock into pellets. It can be seen that each half of each rotor and the corresponding half of each barrel of the mill of FIG. 3 functions in the same manner as the mill of FIG. 1 to thoroughly mix and work the stock.

The advantages of this double ended, double barrel mill of FIG. 3 over the single ended, single barrel mill of FIG. 1 are increased capacity, balanced thrust on the rotors and easier introduction of the stock into the mill. This last mentioned advantage is due to the fact that the counter-rotating rotors tend to pull the stock into the mill more readily than a single rotating rotor.

From the above description it can be seen that there is provided an improved mill of screw or worm type which will thoroughly mix and work all the stock and will prevent unmixed, unworked lumps of stock from passing through the mill. All the stock goes through the same degree of working and mixing so that the stock when discharged from the mill has been uniformly mixed and worked.

It is to be understood that the above description and accompanying drawings are for the purpose of illustration and not by way of limitation and changes and modifications may be made therein without departing from the spirit and the scope of the invention.

Having thus described our invention, what we claim and desire to protect by Letters Patent is:

1. A mill comprising, a rotor member, a stationary barrel member providing a bore in which the rotor member is adapted to be rotated, means for rotating said rotor member, longitudinally extending helical grooves in one of said members, longitudinally extending grooves in said other member, the grooves in one member decreasing to substantially zero depth at at least one point along its length, the grooves in the other member decreasing to substantially zero depth at at least one point along its length spaced longitudinally from said one point on said one member, *the grooves in each of said members changing in depth throughout at least a common portion of the longitudinal extent of said mill between said one point on said one member and said one point on said other member,* said grooves in said rotor member and the grooves in the bore of said barrel member communicating with each other so as to form a continuous passage through the mill through which stock may pass whereby all the stock will pass through the shear plane developed in the clearance between the stationary barrel and the rotating rotor.

2. A mill comprising, a rotor, a stationary barrel providing a bore in which the rotor is adapted to be rotated, means for rotating said rotor, longitudinally extending helical grooves in said rotor, longitudinally extending grooves in the bore of said barrel, the helical grooves in said rotor decreasing to substantially zero depth at at least one point along its length, the grooves in said bore decreasing to substantially zero depth at at least one point along its length spaced from said one point on said rotor, said grooves being co-extensive at least between said one point on said rotor and said one point in said bore of said barrel, *the grooves in each of said rotor and said barrel changing in depth throughout at least a common portion of said coextensive extent between said one point on said rotor and said one point on said barrel* whereby the grooves together form a continuous passage through the mill through which the stock may pass whereby all the stock must pass through the shear plane developed between the rotating rotor and the stationary barrel.

3. A mill comprising, a rotatable rotor, a barrel surrounding said rotor, means for rotating said rotor, an opening in said barrel spaced from one end thereof for receiving stock, helical grooves in said rotor, helical grooves in the interior surface of said barrel, said grooves in said rotor decreasing to substantially zero depth at at least one point along its length, said helical grooves in said barrel decreasing to substantially zero depth at at least one point along its length spaced longitudinally from said one point on said rotor, said grooves being co-extensive at least between said one point on said rotor and said one point in said barrel, *the grooves in each of said rotor and said barrel changing in depth throughout at least a common portion of said coextensive extent between said one point on said rotor and said one point on said barrel* whereby the grooves together form a continuous passage through the mill through which the stock may pass whereby all the stock must pass through the shear plane developed between the stationary barrel and the rotating rotor.

4. A mill comprising, a helically threaded rotor, a stationary barrel having a helically threaded bore in which the rotor is adapted to be rotated, the helical threads of said rotor decreasing to substantially zero depth at at least one point along its length, the helical threads of said bore decreasing to substantially zero depth at at least one point along its length longitudinally spaced from said one point on said rotor, said threads being co-extensive at least between said one point on said rotor and said one point in said barrel, *the grooves in each of said rotor and said barrel changing in depth throughout at least a common portion of said coextensive extent between said one point on said rotor and said one point on said barrel* so that the grooves between said threads on said rotor and in said barrel together form a continuous passage through the mill for the stock and whereby all the stock will pass through the shear plane, developed between the stationary barrel and the rotating rotor.

5. A mill comprising, a helically threaded rotatable rotor, a stationary barrel providing a bore in which the rotor is adapted to be rotated, means for rotating said rotor, an opening in said barrel spaced from one end thereof for receiving stock, the helical threads of said rotor decreasing to substantially zero depth adjacent said one end of said barrel, grooves in said bore of said barrel extending from said one end of the barrel inwardly a substantial distance past the point of substantial zero depth of said threads *and decreasing in depth from a predetermined depth to substantially zero depth during at least a portion of said extent, the grooves in each of said rotor and said stator changing in depth throughout at least a common portion of said extent* whereby stock received through said opening in said barrel will be carried in the grooves formed between the threads of the rotor and be forced into the grooves in the barrel and out the open end thereof, and means carried by the end of said rotor for cutting said stock into pellets as it is forced out the open ends of said grooves in said bore of said barrel.

6. A mill comprising, a rotatable rotor, a barrel providing a bore in which the rotor is adapted to be rotated, means for rotating said rotor, an opening in said barrel spaced from one end thereof for receiving stock, helical threads on said rotor and in said bore, said threads on said rotor and in said bore being non-continuous throughout the distance the between said opening and said one end of the barrel, portions of said threads on said rotor and in said bore being co-extensive so that the threads on said rotor and in said bore together form a continuous passage for the stock from said opening to said end of the barrel, *at least a portion of the grooves in said rotor decreasing in depth throughout a predetermined longitudinal extent of the mill from a predetermined depth to substantially zero depth and at least a portion of the grooves in said barrel increasing in depth throughout substantially the same longitudinal extent of the mill from substantially zero depth to a predetermined depth* whereby all the stock in passing through the mill is subjected to the shearing action developed between the rotating rotor and the stationary barrel.

7. A mill comprising, a helically threaded rotatable rotor, a stationary barrel providing a bore in which the rotor is adapted to be rotated, means for rotating said rotor, an opening in said barrel spaced from one end thereof for receiving stock, the helical threads of said rotor decreasing to substantially zero depth adjacent said one end of said barrel, helical grooves in said bore of said barrel extending from said one end of the barrel inwardly a substantial distance past the point of substantial zero depth of said threads *and decreasing in depth from a predetermined depth to substantially zero depth during at least a portion of said extent, the grooves in each of said rotor and said stator changing in depth throughout at least a common portion of said extent* whereby stock received through said opening in said barrel will be carried in the helical grooves formed between the threads of the rotor and be forced into the helical grooves in the bore of the barrel and out the end thereof, and means carried by the end of said rotor for cutting said stock into pellets as it is forced out the ends of said helical grooves in said bore of said barrel.

8. A mill comprising, a rotor, a stationary barrel providing a bore in which the rotor is adapted to be rotated, means for rotating said rotor, longitudinally extending helical grooves in said rotor, said grooves being non-continuous throughout the length of the rotor, grooves in the bore of said barrel extending between and overlapping said non-continuous sections of said grooves in said rotor so that said grooves in said bore and in said rotor together form a continuous passage through the mill for the stock, *at least a portion of the grooves in said rotor decreasing in depth throughout a predetermined longitudinal extent of the mill from a predetermined depth to substantially zero depth and at least a portion of the grooves in said barrel increasing in depth throughout substantially the same longitudinal extent of the mill from substantially zero depth to a predetermined depth* whereby all the stock in passing through the mill is subjected to the shearing action developed between the rotating rotor and the stationary barrel.

*9. A mill as described in claim 1 in which the rate of change of depth of the grooves in said one member and the rate of change of depth of the grooves in said other member in said common portion are substantially the same.*

*10. A mill as described in claim 1 wherein the grooves in said one of said members decrease in depth in a downstream direction in said common portion and the grooves in said other of said members decrease in depth in an upstream direction in said common portion, and in which the rate of decrease of depth of the grooves in said one member and the rate of decrease of depth of the grooves in said other member in said common portion are substantially the same.*

*11. A mill as described in claim 3 in which the rate of change of depth of the grooves in said rotor and the rate of change of depth of the grooves in said barrel in said common portion are substantially the same.*

*12. A mill as described in claim 11 wherein the grooves in said rotor decrease in depth in a downstream direction in said common portion and the grooves in said barrel decrease in depth in an upstream direction in said common portion.*

*13. A mill as described in claim 1 wherein the grooves in said other of said members are helical, wherein the helical grooves in each of said members change in depth throughout substantially all of said longitudinal space between said one point on said one member and said one point on said other member, the grooves in said one of said members decreasing in depth in a downstream direction in said longitudinal space, the grooves in said other of said members decreasing in depth in an upstream direction in said longitudinal space, and in which the rate of decrease of depth of the grooves in said one member and the rate of decrease of depth of the grooves in said other member in said longitudinal space are substantially the same.*

*14. A mill as described in claim 1 wherein the grooves in said one of said members decrease in depth in a downstream direction in said common portion and the grooves in said other of said members decrease in depth in an upstream direction in said common portion, wherein said one member is said rotor member and said other member is said barrel member, wherein the grooves in each of said members are helical, wherein said rotor member grooves increase in depth from said substantially zero depth to a predetermined depth at at least a second point along the length of said rotor member downstream from said one point thereon, and wherein said barrel member*

*grooves increase in depth from substantially zero depth at a second point on said barrel member in longitudinal alignment with said second point on said rotor member to a predetermined depth at a third point on said barrel member in longitudinal alignment with said one point on said rotor member, said third point on said barrel member being positioned between said one point and said second point thereon, the rate of increase of depth of the rotor member grooves between said one point and said second point on said rotor member being substantially the same as the rate of increase of depth of the barrel member grooves between said second point and said third point on said barrel member.*

*15. A mill as described in claim 8 in which the rate of decrease of depth of the grooves in said portion of said rotor grooves and the rate of increase of depth of the grooves in said portion of said barrel grooves are substantially the same.*

*16. A mill as described in claim 15 and further including a second portion of the grooves in said rotor increasing in depth from substantially zero depth to a predetermined depth throughout a second predetermined longitudinal extent of the mill downstream of said first predetermined longitudinal extent thereof, and a second portion of the grooves in said barrel decreasing in depth from a predetermined depth to substantially zero depth*

*throughout said second longitudinal extent of the mill, the rate of increase of depth of the grooves in said second portion of said rotor grooves and the rate of decrease of depth of the grooves in said second portion of said barrel grooves being substantially the same, whereby all stock passing through the mill is at least twice subjected to the shearing action developed between the rotating rotor and the stationary barrel.*

References Cited by the Examiner

The following references, cited by the Examiner, are of record in the patented file of this patent or the original patent.

UNITED STATES PATENTS

| | | | |
|---|---|---|---|
| 1,141,898 | 6/1915 | Merritt | 241—6 |
| 1,156,096 | 10/1915 | Price | 18—12 |
| 2,200,997 | 5/1940 | Royle | 18—12 |
| 2,524,999 | 10/1950 | Schulerud | 259—6 |
| 2,535,865 | 12/1950 | Poncelet | 18—12 |
| 2,543,307 | 2/1951 | Swallow et al. | 18—2 |

FOREIGN PATENTS

| | | |
|---|---|---|
| 21,652 | 9/1915 | Denmark. |
| 1,003,469 | 3/1952 | France. |

WILLIAM J. STEPHENSON, *Primary Examiner.*